3,160,118
APPARATUS FOR CONTROLLING PRESSURIZATION OF INFLATABLE DUNNAGE MEMBERS ON FREIGHT CARS
George K. Newell, Penn Township, Pa., assignor to Westinghouse Air Brake Company, Wilmerding, Pa., a corporation of Pennsylvania
Original application Apr. 28, 1959, Ser. No. 809,541, now Patent No. 3,076,472, dated Feb. 5, 1963. Divided and this application Aug. 2, 1962, Ser. No. 214,290
8 Claims. (Cl. 105—369)

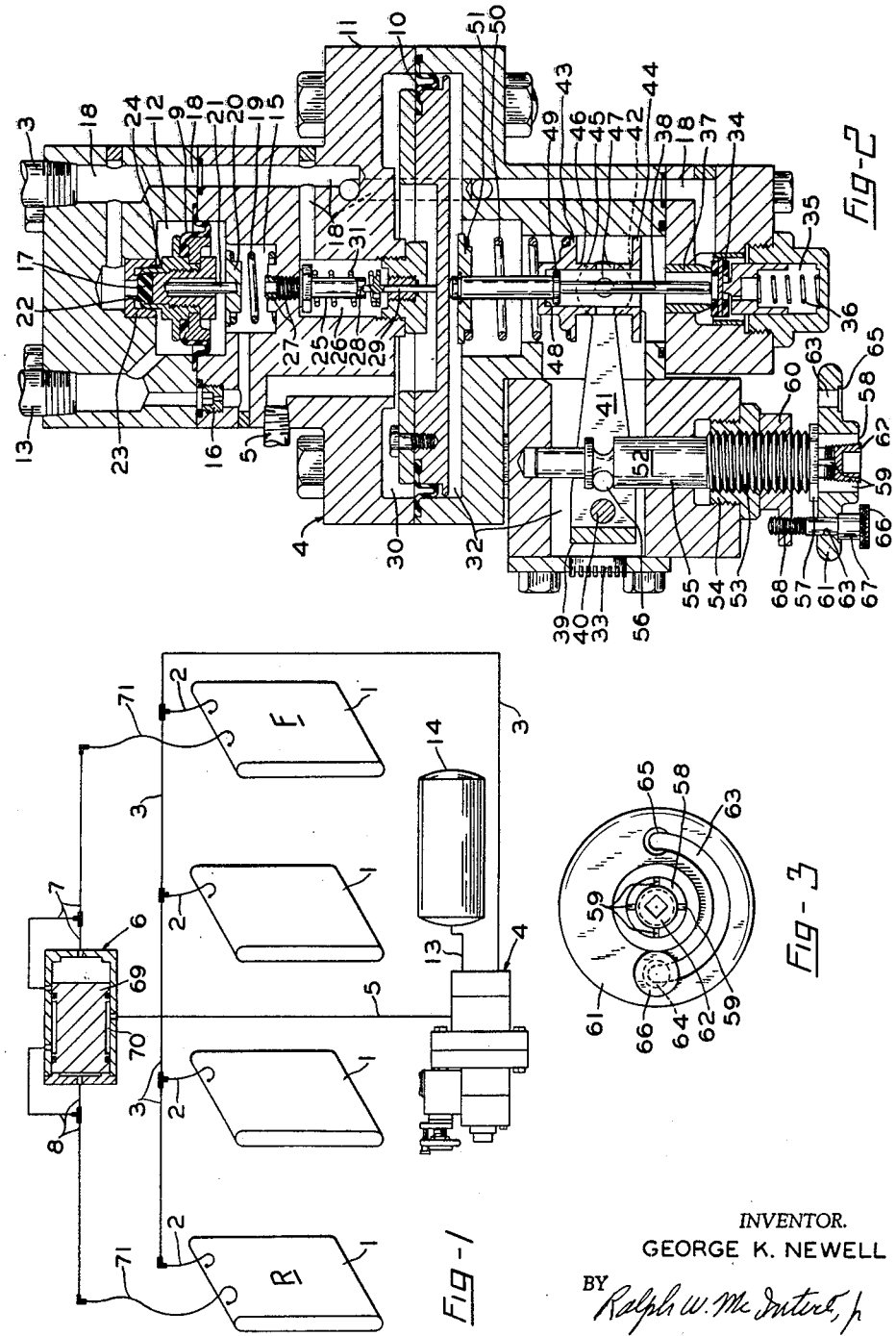
Dec. 8, 1964    G. K. NEWELL    3,160,118
APPARATUS FOR CONTROLLING PRESSURIZATION OF
INFLATABLE DUNNAGE MEMBERS
ON FREIGHT CARS
Original Filed April 28, 1959
INVENTOR.
GEORGE K. NEWELL
BY
Ralph W. McIntire, Jr.
ATTORNEY

United States Patent Office 3,160,118
Patented Dec. 8, 1964

This invention relates to an improved apparatus for controlling the pressure of gas in one or more members of large volume, such as inflatable dunnage members or compartmentalized inflatable igloo-like structures; said apparatus being especially adapted for use in controlling pressure in a plurality of inflatable dunnage members, preferably of the "air mattress" type, that are sandwiched between adjacent cargo units and/or cargo units and an end wall of a freight-carrying conveyance and are simultaneously chargeable with gas under pressure or ventable via a common charging pipe for maintaining the cargo units resiliently shored in substantially fixed positions during transit.

This application is a division of copending application Serial No. 809,541, filed April 28, 1959, now Patent No. 3,076,472 issued February 5, 1963, by George K. Newell and assigned to the same assignee.

One object of the invention is to provide an improved apparatus of the above type embodying a self-lapping type control valve device which is controlled in a novel manner by pressure of fluid in a control pipe, separate from the charging pipe, connected to one of the members for reading the true pressure in such member rather than being falsely influenced by the higher pressure which will be built up in the charging pipe due to the inherent restriction in the rate at which these members, which are of very large volume, can be charged from said charging pipe.

Another object is to provide such a control valve device which will operate automatically to provide large capacity flow of pressure fluid both to and from the members, and therefore render unnecessary the manually operable supply valves and vent valves which have heretofore been proposed, for example, to respectively charge and vent large volume inflatable dunnage members in bypass of a low capacity type control valve device.

A further object is to provide an improved control valve device embodying readily adjustable means affording selection of one of a plurality of predetermined pressure settings for the control valve device over a preselected range of pressures, and thereby eliminating the need for recalibrating the control device each time a different type of cargo unit is loaded into a freight carrying conveyance for transit.

Other objects and advantages will become apparent from the following more detailed description of the invention and from the accompanying drawing wherein: FIG. 1 is a diagrammatic view of an improved apparatus for concurrently controlling pressurization of a plurality of inflatable dunnage members; FIG. 2 is a longitudinal section view of an improved control valve device embodied in said apparatus and shown in outline in FIG. 1; and FIG. 3 is an outline view of the underside as viewed in FIG. 2 of a portion, including a hand wheel, forming part of said control valve device.

Description

As shown in FIG. 1, there is provided an improved apparatus especially suitable for controlling the pressure of fluid in a plurality of preferably rectangular inflatable dunnage members 1 which extend transversely across substantially the full width of the interior of a freight-carrying conveyance, such as a box car or automotive trailer, and are carried by hangers (not shown) that are rollable along two overhead transversely spaced guide tracks (not shown) extending lengthwise of the conveyance, whereby the dunnage members may be stacked at one end of the conveyance when not in use and may be moved to any desired position lengthwise of the conveyance and sandwiched between cargo units as the conveyance is loaded. These dunnage members 1 are connectable via respective flexible hose couplings 2 to a common manifold or charging pipe 3 that extends the length of the conveyance. These flexible hose couplings 2 normally dangle from the pipe 3 at spaced intervals along its length and each coupling is preferably provided with a spring-loaded check valve (not shown) which is mechanically unseated when such coupling is connected to a dunnage member 1 in order to permit free flow of pressure fluid between such member and the pipe 3, but is seated to prevent loss of pressure fluid from said pipe when such coupling is disconnected from a dunnage member. The arrangement as thus far described has heretofore been proposed.

According to the invention, the improved apparatus comprises a self-lapping type control valve device 4 controlled in a novel manner by pressure of fluid in a control pipe 5 separate from the charging pipe 3 for controlling the pressure of fluid provided in the members 1; and said apparatus also preferably, though not necessarily, comprises a selector valve device 6 for connecting to the control pipe 5 either a pipe 7 or a pipe 8 according to which of these pipes 7, 8 is charged with fluid at the lesser pressure, for reasons presently to be explained.

As shown in FIG. 2, the control valve device 4 comprises two movable abutments, preferably in the form of diaphragm pistons 9, 10, which are reciprocably mounted in a sectionalized casing 11 and are preferably of different effective areas. The smaller piston 9 has at one side a chamber 12 having substantially unrestricted connection with a supply pipe 13 leading to a supply reservoir 14 and has at the opposite side a chamber 15 having restricted connection with the supply pipe 13 via a choke 16. Coaxially connected to piston 9 is a supply valve 17 that controls flow of pressure fluid from chamber 12 to a charging passage 18 that is connected to charging pipe 3. A helical bias spring 19 in chamber 15 may act directly on piston 9 or, as is preferred, operatively acts thereon through the medium of a spring seat disc 20 and pusher stem 21, for biasing the piston to a supply-valve-seating position in which it is shown, when fluid pressure in chamber 15 is within a certain degree, such as about 6 p.s.i., of the pressure in chamber 12; whereupon supply valve 17 will be seated against an annular valve seat rib 22 encircling an opening through an annular valve seat member 23 that is press fit into the end wall of chamber 12 and preferably has a beveled counterbore 24 into which a supply valve overlying portion of piston 9 projects. A bleed-off valve device 25 of the poppet type is provided for controlling fluid pressure connection of chamber 15 with a chamber 26 open to passage 18. This device 25, which may be of the well-known Schrader automobile tire type, comprises an externally threaded annular portion 27 sealingly screw-threaded into an opening through a casing partition separating the chambers 15, 26 and also comprises a poppet valve (not shown) operative to prevent flow between said chambers except when a valve stem 28 in chamber 26 is pushed inwardly of said device (upwardly, as viewed in FIG. 2) by a pusher stem 29 arranged coaxially with said stem 28 and piston 10, though not necessarily with piston 9.

Intermediate its ends pusher stem 29 has sealing slidably guided contact with the wall of aligned bores through a nut and plug constituting, in effect, a casing partition separating chamber 26 from a control chamber 30 provided at one side of piston 10 and constantly open to control pipe 5. A light helical spring 31 in chamber 26 biases stem 29 in a valve-stem-disengaging direction and into contact with said one side of piston 10, such that the valve of device 25 will prevent flow between chambers 15, 26 unless piston 10 is applying a thrust force to the valve stem 28 via pusher stem 29.

At the opposite side of piston 10 is a chamber 32 which is open to atmosphere via a debris-excluding screen or grill 33. Arranged coaxially with, and at the chamber 32 side of, piston 10 is a preferably disc-shaped poppet type release valve 34 that is contained in a chamber 35 always open to passage 18 and is operatively biased, by a light helical spring 36 in chamber 35, into seating contact with an annular valve seat rib on an annular member 37, sealingly press fit into an aligned bore through a casing partition separating the chambers 32, 35, for thereby normally preventing release flow of pressure fluid from charging passage 18 and hence pipe 3 to atmospheric chamber 32. Valve 34 is adapted to be unseated against the bias of spring 36 by a thrust force delivered thereto either directly from piston 10, or independently of said piston in the manner hereinafter to be described, by an aligned valve stem 38 extending through chamber 32 and with substantial radial clearance into the annular member 37.

A bifurcated lever 39 disposed in chamber 32 is rockably carried on a fulcrum pin 40 that is carried by casing 11 and has an axis perpendicular to and offset from the axis of valve stem 38. This lever 39 has two arms 41 (only one of which is shown) which extend toward valve stem 38 and terminate in rounded portions 42 that straddle valve stem 38 and bear against the adjacent ends of axially spaced annular flanges 43, 44 projecting radially outward from a valve-stem-encircling annular cylindrical portion 45 of a generally spool-shaped reciprocable element 46. A plurality of radial ports 47 preferably extend radially through portion 45 to assure free flow of pressure fluid from passage 18 to atmospheric chamber 32 when valve 34 is unseated, even if flange 44 should then be near or engage member 37. Portion 45 provides an inwardly directed annular shoulder 48 which overlies and is normally spaced axially from a fixed collar 49 on valve stem 38.

A helical regulating spring 50 in chamber 32 seats against the outer end of flange 43 and acts through a spring seat washer 51 and a retaining ring snapped on valve stem 38 to normally bias said valve stem into contact with piston 10 and thereby transmit to said piston a bias force that corresponds to the adjusted bias effect of spring 50 and opposes the force exerted on said piston by pressure fluid in control chamber 30.

Adjustment of the effective bias of spring 50 is accomplished by the following structure. An adjusting screw 52 has an axis parallel to, but offset from, that of valve stem 38. Screw 52 comprises an externally threaded portion 53 screw threaded within a nut 54 that overlies the outer end of, and is screwed into, a counterbore extending inwardly of the casing 11 and joining a bore open to chamber 32 in proximity of lever 39. Screw 52 also comprises an unthreaded cylindrical portion 55 which has slidably guided contact with the wall of the last-mentioned bore and extends upwardly through chamber 32 and between the arms 41 of lever 39. Portion 55 is provided with an annular groove for accommodating a tangentially arranged pin 56 that is carried by the lever arms 41 and is parallel to pin 40, so that upon rotation of screw 52 lever 39 will be rocked on pin 40 and thereby vary the axial position of element 46 and hence the bias effect of spring 50. Screw 52 also has a wrench-engageable portion 57 projecting exteriorly of the nut 54 and disposed between portion 53 and an annular cylindrical portion 58 having diametral slits 59. A lock nut 60, which is screw threaded onto screw-threaded portion 53 before it is screwed into nut 54, is adapted to abut the outer end of nut 54. A rotatable member, such as a hand wheel 61, is mountable over annular portion 58 and adapted to be rotatively locked to screw 52 by a pipe plug 62 that is screwable into the annular opening in portion 58 for radially spreading the slitted annular portion 58. Intermediate its axis and outer peripheral edge, hand wheel 61 has a concentrically arranged through slot 63 (FIG. 3) extending through a chosen, such as 180-degree, arc and terminating in shallow counterbore-like recesses 64, 65 extending inwardly from the lower end of said hand wheel as viewed in FIG. 2. A locking element 66 comprises a knurled handle coaxially joining a large cylindrical head portion 67 which is seatable in either of the recesses 64, 65 and joins a smaller cylindrical portion slidably movable within the slot 63; and the latter portion projects upward exteriorly of the hand wheel and terminates in a threaded portion which is screw-threadable into an alignable bore 68 extending through the lock nut 60 eccentrically of its axis of rotation on screw 52.

The selector valve device 6, if used, may comprise a shuttle-type valve 69 sealingly reciprocable in a sectionalized casing and subject opposingly to pressure of fluid in pipes 7, 8. Valve 69 has an elongated annular cavity 70 for selectively connecting to the pipe 5 either a branch of pipe 7 or a branch of pipe 8 according to which of the pipes 7, 8 contains fluid at the lesser pressure. The pipes 7, 8 extend toward both ends of the freight-carrying conveyance; and flexible hose couplings 71 identical with the couplings 2 are connected to the remote ends of these pipes and are detachably connectable to those dunnage members 1 designated by the letters "F" and "R" which are nearest the front end and rear end of the conveyance, respectively.

It should be noted that the points of attachment of the hose couplings 2, 71 with each of the dunnage members F and R should be widely spaced, such as at least three feet apart, so that the fluid pressure obtained in the pipes 7 and 8 will accurately represent the pressures of fluid in the dunnage members F and R, respectively, and not represent a false pressure such as could be obtained due to the high pressure head in charging pipe 3 if these points of attachment are close together.

*Operation*

Assume initially that the front and rear dunnage members F and R are deflated and hooked up to couplings 2, 71 and each sandwiched between a respective end wall of the conveyance and an adjacent cargo unit; that each intervening dunnage member 1 is deflated and hooked up to a coupling 2 and sandwiched between adjacent cargo units; that the cargo units comprise fragile cargo, such as bottled or canned goods contained in palletized cardboard cartons, which calls for a low degree of inflation of all dunnage members.

Assume further the reservoir 14 is devoid of fluid under pressure; that valve 69 of device 6 is positioned so that rear dunnage member R is connected via pipe 8 and valve cavity 70 to control pipe 5 and hence control chamber 30 of device 4; that screw 52 has been rotatively positioned relative to nut 54 so as to operatively adjust the bias of spring 50 to a low value requiring a desired low fluid pressure, of such as about ½ p.s.i., in chamber 30 to shift the large area piston 10 against said spring; that lock nut 60 engages nut 54; that hand wheel 61 has been rotatably locked by pipe plug 62 to portion 58 of screw 52 after having been rotated to a position in which recess 64 is coaxially aligned with bore 68; and that locking element 66 has been screwed into bore 68 and seats against the recess 64 for thereby locking the hand wheel 61 and screw 52 against rotation in a direction for increasing the adjusted bias of spring 50.

Under these assumed conditions, the various components will be in the respective positions in which they are shown in the drawing.

To simultaneously inflate the dunnage members 1 for resiliently shoring the cargo units in place, the supply reservoir 14 is charged with pressure fluid from a suitable wayside source, such as an air compressor (not shown), to a high pressure of such as about 100 p.s.i. Pressure fluid will then flow via pipe 13 to chamber 12 and promptly shift piston 9 for unseating supply valve 17 and permitting pressure fluid to flow from reservoir 14 to passage 18 and thence via pipe 3 and couplings 2 to all dunnage members 1 for inflating the latter into contact with the cargo units. Meanwhile, reservoir pressure fluid will bleed through choke 16 into chamber 15 but will be dissipated therefrom into passage 18 because spring 50, acting through washer 51 and stem 38, will bias piston 10 upwardly and exert a thrust force via stem 29 on valve stem 28 which will hold bleed-off valve device 25 open.

Pressure fluid will be supplied at a fast rate from reservoir 14 past supply valve 17 to all of the dunnage members 1 until fluid pressure in the rear dunnage member R, and hence in control chamber 30 of device 4 (as noted via pipe 8, cavity 70 of device 6 and control pipe 5), has increased to the desired pressure illustratively assumed as ½ p.s.i., corresponding to the adjusted bias of spring 50; whereupon fluid pressure in chamber 30 will shift piston 10 against resistance of spring 50 and permit spring 31 to push pusher stem 29 downward out of contact with valve stem 28, resulting in closure of bleed-off valve device 25 and isolation of chamber 15 from passage 18. Due to the small volume of chamber 15, fluid pressure in said chamber will quickly build up via choke 16 to equality with the pressure in chamber 12, and thus permit piston 9 to be shift upward by the force of spring 19 and seat supply valve 17 for terminating flow of pressure fluid from reservoir 14 to the charging pipe 3. Such termination of flow of pressure fluid to pipe 3 will terminate before pressure fluid in chamber 30 builds up enough to cause piston 10 to move down far enough against the force of spring 50 to operatively unseat release valve 34; and hence valve 34 will remain seated. With valves 17, 34, concurrently seated, the device 4 will be in a lap position in which fluid under pressure is bottled up in the dunnage members 1 at the desired pressure.

It is to be noted that during inflation of dunnage members 1, fluid under pressure will flow from passage 18 through pipe 3 and hose couplings 2 at a substantially unrestricted rate because said couplings are of such flow capacity as not to restrict the rate of flow from pipe 3; however, due to the large volume of the dunnage members in relation to the flow capacity of the charging pipe 3 and couplings 2, there will be some restriction in the rate at which pressure fluid can be conveyed from the couplings into the dunnage members. Hence, the piston 9 will seek and find a position in which the supply valve 17 is opened a maximum permissible degree consistent with the ability of couplings 2 to convey pressure fluid to the dunnage members. For example, with reservoir 14 charged to 100 p.s.i., the pressure in the couplings 2 and charging passage 18 and hence in chamber 15 may be about 20 p.s.i. during charging of the dunnage members. This "self-throttling" control of supply valve 17 is preferably, though not necessarily, assisted by the provision of the beveled counterbore 24 in member 23 which will help in throttling flow past supply valve 17 as the latter is moved toward seat rib 22.

With the arrangement as thus far described, it will be noted that the supply valve 17 will be maintained open a maximum permissible degree until fluid pressure as noted in dunnage member R (rather than in the charging pipe 3 or passage 18) builds up to the desired pressure corresponding to the adjusted bias of spring 50; and that the dunnage members 1 will be inflated automatically and very rapidly without requiring manually operable by-pass type auxiliary supply valve means such as heretofore proposed to increase the rate of initial inflation.

Assume now that the dunnage members 1 have been inflated to the desired pressure; and that due to changes in ambient temperature, weather or altitude during transit, the pressure of fluid in all of the dunnage members 1 should tend to decrease below or increase above the desired pressure, illustratively assumed as ½ p.s.i.

If the pressure in control chamber 30 of device 4 decreases slightly below the desired pressure, spring 50 will operatively shift piston 10 upwardly and through the stems 29, 28, reopen the bleed-off valve device 25; whereupon reservoir pressure fluid may flow via choke 16 and chamber 15 into passage 18, for causing a gradual build up in pressure in the dunnage members 1 without necessarily causing piston 9 to shift against the force of spring 19 and unseat the supply valve 17, for supplying pressure fluid to the dunnage members until the pressure in dunnage member R and hence in chamber 30 builds up to the desired pressure and permits reclosure of valve device 25 (and then closure of supply valve 17 if it had been opened).

If, however, pressure in the dunnage members 1 and hence in chamber 30 increases above the desired pressure, piston 10 will be shifted downward far enough against the force of spring 50 to cause valve stem 38 to unseat release valve 34. With valve 34 unseated, pressure fluid will flow from the members 1 via passage 18, chamber 35, the annular opening in seat member 37, and chamber 32 to atmosphere until fluid pressure in control chamber 30 reduces to said desired pressure and causes spring 50 to shift piston 10 upward and retract stem 38 for enabling spring 36 to reseat release valve 34.

Assume now that while dunnage members 1 are inflated to the desired pressure, a shock in transit, such as due to a rapid stop, causes the resiliently shored cargo units to shift slightly forward relative to the conveyance and thereby increase the fluid pressure in the front dunnage member F and to some lesser degree reduce the fluid pressure in the rear dunnage member R. While theoretically the fluid pressures in all dunnage members 1 should promptly equalize, especially since the hose couplings 2 and charging pipe 3 in themselves provide no restriction to flow between the various dunnage members, it will be apparent that such prompt equalization of fluid pressures is impossible because of the large volumes of these members in relation to the flow capacity of couplings and pipe 3. The selector valve device 6 is therefore provided to detect and nullify the effect on the device 4 of these unnatural variations in fluid pressure.

For instance, upon a shock-induced or other artificially caused local increase in fluid pressure in the front dunnage member F, which may amount to as much as 5 p.s.i., the consequent increase in fluid pressure in pipe 7 to a pressure above that in pipe 8 will cause valve 69 of device 6 to shift to a "rear control position," in which it is shown (if it is not already there) so that the pressure in chamber 30 of control valve device 4 will be controlled from dunnage member R which is less affected by such shock. This will prevent release valve 34 from being unseated in response to the local pressure condition in member F and thus prevent venting of pipe 3 and all of the member 1 at large capacity before the control valve device 4 realizes its "mistake" and then commences to supply reservoir pressure fluid to the members 1 to restore them to the desired pressure.

It will be apparent that if no selector valve device 6 were employed and member F were constantly connected to chamber 30, the control valve device 4 would respond to each shock-induced local increase in fluid pressure in member F to successively release pressure fluid from and then supply reservoir pressure fluid to the pipe 3 and all dunnage members 1, with the result that pressure in reservoir 14 would quickly be depleted to such a low value that it soon would be unable to maintain the dunnage members 1 at the desired pressure. It will also be apparent that even if pressure in the rear dunnage member R should drop below the desired pressure of ½ p.s.i., due to such shock, it will not drop appreciably; and hence even if the control valve device 4 should commence to charge the dunnage members 1 in response to this drop in pressure in member R, very little depletion of reservoir pressure will occur before the valve device realizes its "mistake."

It will be understood that while the device 6 is especially desirable on conveyances such as freight cars, where either end may be the forward end, the device 6 also will serve to nullify false pressure conditions in the rear dunnage member R if a freight car or automotive trailer is braked suddenly while being backed into a siding or terminal, or a freight car is subjected to a rear-end impact blow while being humped.

If it is desired to employ the apparatus without using the selector valve device 6, then the control pipe 5 should be constantly connected via a coupling, such as 71, solely to a dunnage member 1 that is sandwiched between adjacent cargo units near the middle of the conveyance (rather than between an end of the conveyance and an adjacent cargo unit) so as to reduce the magnitude of any shock-induced false pressure condition.

To deflate the dunnage members 1 for permitting unloading of cargo units at destination, the hand wheel 61 is rotated counterclockwise as viewed in FIG. 3 for unscrewing adjusting screw 52 outwardly of nut 54 and also, due to the locking action of element 66, simultaneously withdrawing lock nut 60 from abutting contact with nut 54. As pin 56 is carried downward, as viewed in FIG. 2, by this unscrewing movement of screw 52, lever 39 will be rocked downward about pin 40 and through engagement of rounded portions 42 with flange 44 shift reciprocable element 46 downward relative to valve stem 38. As element 46 moves downward, shoulder 48 will successively engage collar 49 of valve stem 38 and thus effectively cage spring 50 and then said valve stem will be pulled downward by contact with shoulder 48 and successively abut and then unseat release valve 34 for venting fluid under pressure at a very rapid rate from the dunnage members 1 via pipe 3, passage 18, chamber 35, the annular opening in seat member 37, the ports 47 and atmospheric chamber 32; said ports 47 serving to prevent any restriction in the rate of such venting, as and when the element 46 attains a lower limit position defined by contact of flange 44 with the lower end wall of chamber 32.

After the dunnage members 1 are vented, the cargo units may be unloaded, it being noted that the couplings 2 or 2, 71 should be disconnected to permit the dunnage members to be moved longitudinally of the conveyance and out of the way as cargo units are successively removed.

Assume now that the conveyance has been reloaded, in the manner earlier described, and the supply reservoir 14 has been recharged. Since spring 50 is still caged, in the manner above explained, said spring cannot bias the piston 10 to its bleed-off-valve-opening position and hence pressure fluid will remain bottled up in the reservoir 14 during loading of the cargo units. To inflate the dunnage members 1, hand wheel 61 is rotated clockwise, as viewed in FIG. 3, until the lock nut 60 again abuts the nut 54. During this operation, release valve 34 will reseat, then spring 50 will be uncaged, and finally the element 46 will be restored to its former position and thus restore the adjusted bias of spring 50 to the identical value it previously had. Thus, with the improvbed apparatus herein disclosed, recalibration of the control valve device 4 after each unloading of the conveyance is not necessary. The device 4 will operate in the manner previously described to inflate the dunnage members 1 to the desired pressure corresponding to the adjusted bias of spring 50.

If, however, the cargo units just loaded into the conveyance are very heavy, such as refrigerators, and a higher pressure is deemed advisable in the dunnage members 1 to adequately shore these cargo units, then the spring 50 is readily adjusted to a predetermined high pressure setting in the following manner. Preferably, before the hand wheel 61 is rotated clockwise to return the lock nut 60 into contact with nut 54, the locking element 66 is screwed out of bore 68 just far enough to withdraw head portion 67 from the recess 64 corresponding to the predetermined low pressure setting. Then locking element 66 is swung arcuately counterclockwise, as viewed in FIG. 3, relative to hand wheel 61 and screw 52 through slot 63, until said element is aligned with the recess 65 corresponding to the predetermined high pressure setting. Meanwhile, since the element 66 still has screw-threaded engagement with bore 68, lock nut 60 will be spun downward a corresponding degree on screw 52 by said element as the latter is moved arcuately through slot 63. After element 66 is aligned with recess 65, it is screwed back into bore 68 to seat head portion 67 in recess 65; whereupon the lock nut 60 and hand wheel 61 will once again be rotatively locked to each other, as well as to screw 52. Hand wheel 61 is now rotated clockwise, as viewed in FIG. 3, far enough to carry the lock nut 60 into engagement with nut 54, meanwhile advancing screw 52 one-half a turn greater (because of the 180 degree spacing of recesses 64, 65) than it would have been turned if the element 66 had remained in recess 64. This additional half turn of screw 52 will cause element 46 to be moved upward a corresponding distance from the position in which it is shown in FIG. 2 and thereby effect a corresponding increase in the adjusted bias of spring 50. Thus, control valve device 4 will now operate, in the manner and under the conditions previously described, to maintain in the dunnage members 1 fluid at a desired higher pressure such as 1 p.s.i., rather than the former desired pressure illustratively assumed as ½ p.s.i.

It will be understood that instead of just a low pressure and a high pressure setting (according to whether element 66 is locked in recess 64 or recess 65), additional recesses similar to 64, 65 and spaced therebetween along slot 63 may be provided for affording predetermined intervening pressure settings; or the arc subtended between the lowest and highest pressure settings may be increased or reduced to correspondingly increase or decrease the range in adjusted bias values for spring 50, etc. It will be apparent that the range between the lowest and highest pressure settings will be fixed according to the lead of screw 52, the length of the moment arm of lever 39, the spring deflection constant of spring 50, etc.; and in the examples cited herein, this range will correspond to the ½ p.s.i. difference between the low pressure setting of ½ p.s.i. and high pressure setting of 1 p.s.i. However, it is to be noted that while the range is fixed, the valve device 4 may be readily calibrated to provide other low and high pressure settings of say ¼ p.s.i. and ¾ p.s.i., in the following manner.

To calibrate the control valve device 4, hand wheel 61 is screwed counterclockwise to its quick or manual deflate position, in which element 46 is in its previously described lower limit position and release valve 34 is operatively unseated; then said hand wheel is removed by removing plug 62 and element 66. Then the chamber 12 is connected to a source of pressure fluid; chamber 30 and passage 18 are connected to a calibrating volume or a single dunnage member 1; and a pressure gage is hooked up to read pressure in the chamber 30. Lock nut 60 is then spun downward on screw 52. Screw 52 is thereafter slowly screwed inwardly of nut 54, by applying a wrench force to wrench-engageable portion 57, for operatively causing successive reseating of release valve 34 and uncaging of spring 50, in the same manner as when said hand wheel 61 and screw 52 against rotation in a direction for increasing the adjusted bias of spring 50.

Under these assumed conditions, the various components will be in the respective positions in which they are shown in the drawing.

To simultaneously inflate the dunnage members 1 for resiliently shoring the cargo units in place, the supply reservoir 14 is charged with pressure fluid from a suitable wayside source, such as an air compressor (not shown), to a high pressure of such as about 100 p.s.i. Pressure fluid will then flow via pipe 13 to chamber 12 and promptly shift piston 9 for unseating supply valve 17 and permitting pressure fluid to flow from reservoir 14 to passage 18 and thence via pipe 3 and couplings 2 to all dunnage members 1 for inflating the latter into contact with the cargo units. Meanwhile, reservoir pressure fluid will bleed through choke 16 into chamber 15 but will be dissipated therefrom into passage 18 because spring 50, acting through washer 51 and stem 33, will bias piston 10 upwardly and exert a thrust force via stem 29 on valve stem 28 which will hold bleed-off valve device 25 open.

Pressure fluid will be supplied at a fast rate from reservoir 14 past supply valve 17 to all of the dunnage members 1 until fluid pressure in the rear dunnage member R, and hence in control chamber 30 of device 4 (as noted via pipe 8, cavity 70 of device 6 and control pipe 5), has increased to the desired pressure illustratively assumed as ½ p.s.i., corresponding to the adjusted bias of spring 50; whereupon fluid pressure in chamber 30 will shift piston 10 against resistance of spring 50 and permit spring 31 to push pusher stem 29 downward out of contact with valve stem 28, resulting in closure of bleed-off valve device 25 and isolation of chamber 15 from passage 18. Due to the small volume of chamber 15, fluid pressure in said chamber will quickly build up via choke 16 to equality with the pressure in chamber 12, and thus permit piston 9 to be shift upward by the force of spring 19 and seat supply valve 17 for terminating flow of pressure fluid from reservoir 14 to the charging pipe 3. Such termination of flow of pressure fluid to pipe 3 will terminate before pressure fluid in chamber 30 builds up enough to cause piston 10 to move down far enough against the force of spring 50 to operatively unseat release valve 34; and hence valve 34 will remain seated. With valves 17, 34, concurrently seated, the device 4 will be in a lap position in which fluid under pressure is bottled up in the dunnage members 1 at the desired pressure.

It is to be noted that during inflation of dunnage members 1, fluid under pressure will flow from passage 18 through pipe 3 and hose couplings 2 at a substantially unrestricted rate because said couplings are of such flow capacity as not to restrict the rate of flow from pipe 3; however, due to the large volume of the dunnage members in relation to the flow capacity of the charging pipe 3 and couplings 2, there will be some restriction in the rate at which pressure fluid can be conveyed from the couplings into the dunnage members. Hence, the piston 9 will seek and find a position in which the supply valve 17 is opened a maximum permissible degree consistent with the ability of couplings 2 to convey pressure fluid to the dunnage members. For example, with reservoir 14 charged to 100 p.s.i., the pressure in the couplings 2 and charging passage 18 and hence in chamber 15 may be about 20 p.s.i. during charging of the dunnage members. This "self-throttling" control of supply valve 17 is preferably, though not necessarily, assisted by the provision of the beveled counterbore 24 in member 23 which will help in throttling flow past supply valve 17 as the latter is moved toward seat rib 22.

With the arrangement as thus far described, it will be noted that the supply valve 17 will be maintained open a maximum permissible degree until fluid pressure as noted in dunnage member R (rather than in the charging pipe 3 or passage 18) builds up to the desired pressure corresponding to the adjusted bias of spring 50; and that the dunnage members 1 will be inflated automatically and very rapidly without requiring manually operable by-pass type auxiliary supply valve means such as heretofore proposed to increase the rate of initial inflation.

Assume now that the dunnage members 1 have been inflated to the desired pressure; and that due to changes in ambient temperature, weather or altitude during transit, the pressure of fluid in all of the dunnage members 1 should tend to decrease below or increase above the desired pressure, illustratively assumed as ½ p.s.i.

If the pressure in control chamber 30 of device 4 decreases slightly below the desired pressure, spring 50 will operatively shift piston 10 upwardly and through the stems 29, 28, reopen the bleed-off valve device 25; whereupon reservoir pressure fluid may flow via choke 16 and chamber 15 into passage 18, for causing a gradual build up in pressure in the dunnage members 1 without necessarily causing piston 9 to shift against the force of spring 19 and unseat the supply valve 17, for supplying pressure fluid to the dunnage members until the pressure in dunnage member R and hence in chamber 30 builds up to the desired pressure and permits reclosure of valve device 25 (and then closure of supply valve 17 if it had been opened).

If, however, pressure in the dunnage members 1 and hence in chamber 30 increases above the desired pressure, piston 10 will be shifted downward far enough against the force of spring 50 to cause valve stem 38 to unseat release valve 34. With valve 34 unseated, pressure fluid will flow from the members 1 via passage 18, chamber 35, the annular opening in seat member 37, and chamber 32 to atmosphere until fluid pressure in control chamber 30 reduces to said desired pressure and causes spring 50 to shift piston 10 upward and retract stem 38 for enabling spring 36 to reseat release valve 34.

Assume now that while dunnage members 1 are inflated to the desired pressure, a shock in transit, such as due to a rapid stop, causes the resiliently shored cargo units to shift slightly forward relative to the conveyance and thereby increase the fluid pressure in the front dunnage member F and to some lesser degree reduce the fluid pressure in the rear dunnage member R. While theoretically the fluid pressures in all dunnage members 1 should promptly equalize, especially since the hose couplings 2 and charging pipe 3 in themselves provide no restriction to flow between the various dunnage members, it will be apparent that such prompt equalization of fluid pressures is impossible because of the large volumes of these members in relation to the flow capacity of couplings and pipe 3. The selector valve device 6 is therefore provided to detect and nullify the effect on the device 4 of these unnatural variations in fluid pressure.

For instance, upon a shock-induced or other artificially caused local increase in fluid pressure in the front dunnage member F, which may amount to as much as 5 p.s.i., the consequent increase in fluid pressure in pipe 7 to a pressure above that in pipe 8 will cause valve 69 of device 6 to shift to a "rear control position," in which it is shown (if it is not already there) so that the pressure in chamber 30 of control valve device 4 will be controlled from dunnage member R which is less affected by such shock. This will prevent release valve 34 from being unseated in response to the local pressure condition in member F and thus prevent venting of pipe 3 and all of the member 1 at large capacity before the control valve device 4 realizes its "mistake" and then commences to supply reservoir pressure fluid to the members 1 to restore them to the desired pressure.

It will be apparent that if no selector valve device 6 were employed and member F were constantly connected to chamber 30, the control valve device 4 would respond to each shock-induced local increase in fluid pressure in member F to successively release pressure fluid from and then supply reservoir pressure fluid to the pipe 3 and all dunnage members 1, with the result that pressure in reservoir 14 would quickly be depleted to such a low value that it soon would be unable to maintain the dunnage members 1 at the desired pressure. It will also be apparent that even if pressure in the rear dunnage member R should drop below the desired pressure of ½ p.s.i., due to such shock, it will not drop appreciably; and hence even if the control valve device 4 should commence to charge the dunnage members 1 in response to this drop in pressure in member R, very little depletion of reservoir pressure will occur before the valve device realizes its "mistake."

It will be understood that while the device 6 is especially desirable on conveyances such as freight cars, where either end may be the forward end, the device 6 also will serve to nullify false pressure conditions in the rear dunnage member R if a freight car or automotive trailer is braked suddenly while being backed into a siding or terminal, or a freight car is subjected to a rear-end impact blow while being humped.

If it is desired to employ the apparatus without using the selector valve device 6, then the control pipe 5 should be constantly connected via a coupling, such as 71, solely to a dunnage member 1 that is sandwiched between adjacent cargo units near the middle of the conveyance (rather than between an end of the conveyance and an adjacent cargo unit) so as to reduce the magnitude of any shock-induced false pressure condition.

To deflate the dunnage members 1 for permitting unloading of cargo units at destination, the hand wheel 61 is rotated counterclockwise as viewed in FIG. 3 for unscrewing adjusting screw 52 outwardly of nut 54 and also, due to the locking action of element 66, simultaneously withdrawing lock nut 60 from abutting contact with nut 54. As pin 56 is carried downward, as viewed in FIG. 2, by this unscrewing movement of screw 52, lever 39 will be rocked downward about pin 40 and through engagement of rounded portions 42 with flange 44 shift reciprocable element 46 downward relative to valve stem 38. As element 46 moves downward, shoulder 48 will successively engage collar 49 of valve stem 38 and thus effectively cage spring 50 and then said valve stem will be pulled downward by contact with shoulder 48 and successively abut and then unseat release valve 34 for venting fluid under pressure at a very rapid rate from the dunnage members 1 via pipe 3, passage 18, chamber 35, the annular opening in seat member 37, the ports 47 and atmospheric chamber 32; said ports 47 serving to prevent any restriction in the rate of such venting, as and when the element 46 attains a lower limit position defined by contact of flange 44 with the lower end wall of chamber 32.

After the dunnage members 1 are vented, the cargo units may be unloaded, it being noted that the couplings 2 or 2, 71 should be disconnected to permit the dunnage members to be moved longitudinally of the conveyance and out of the way as cargo units are successively removed.

Assume now that the conveyance has been reloaded, in the manner earlier described, and the supply reservoir 14 has been recharged. Since spring 50 is still caged, in the manner above explained, said spring cannot bias the piston 10 to its bleed-off-valve-opening position and hence pressure fluid will remain bottled up in the reservoir 14 during loading of the cargo units. To inflate the dunnage members 1, hand wheel 61 is rotated clockwise, as viewed in FIG. 3, until the lock nut 60 again abuts the nut 54. During this operation, release valve 34 will reseat, then spring 50 will be uncaged, and finally the element 46 will be restored to its former position and thus restore the adjusted bias of spring 50 to the identical value it previously had. Thus, with the improvbed apparatus herein disclosed, recalibration of the control valve device 4 after each unloading of the conveyance is not necessary. The device 4 will operate in the manner previously described to inflate the dunnage members 1 to the desired pressure corresponding to the adjusted bias of spring 50.

If, however, the cargo units just loaded into the conveyance are very heavy, such as refrigerators, and a higher pressure is deemed advisable in the dunnage members 1 to adequately shore these cargo units, then the spring 50 is readily adjusted to a predetermined high pressure setting in the following manner. Preferably, before the hand wheel 61 is rotated clockwise to return the lock nut 60 into contact with nut 54, the locking element 66 is screwed out of bore 68 just far enough to withdraw head portion 67 from the recess 64 corresponding to the predetermined low pressure setting. Then locking element 66 is swung arcuately counterclockwise, as viewed in FIG. 3, relative to hand wheel 61 and screw 52 through slot 63, until said element is aligned with the recess 65 corresponding to the predetermined high pressure setting. Meanwhile, since the element 66 still has screw-threaded engagement with bore 68, lock nut 60 will be spun downward a corresponding degree on screw 52 by said element as the latter is moved arcuately through slot 63. After element 66 is aligned with recess 65, it is screwed back into bore 68 to seat head portion 67 in recess 65; whereupon the lock nut 60 and hand wheel 61 will once again be rotatively locked to each other, as well as to screw 52. Hand wheel 61 is now rotated clockwise, as viewed in FIG. 3, far enough to carry the lock nut 60 into engagement with nut 54, meanwhile advancing screw 52 one-half a turn greater (because of the 180 degree spacing of recesses 64, 65) than it would have been turned if the element 66 had remained in recess 64. This additional half turn of screw 52 will cause element 46 to be moved upward a corresponding distance from the position in which it is shown in FIG. 2 and thereby effect a corresponding increase in the adjusted bias of spring 50. Thus, control valve device 4 will now operate, in the manner and under the conditions previously described, to maintain in the dunnage members 1 fluid at a desired higher pressure such as 1 p.s.i., rather than the former desired pressure illustratively assumed as ½ p.s.i.

It will be understood that instead of just a low pressure and a high pressure setting (according to whether element 66 is locked in recess 64 or recess 65), additional recesses similar to 64, 65 and spaced therebetween along slot 63 may be provided for affording predetermined intervening pressure settings; or the arc subtended between the lowest and highest pressure settings may be increased or reduced to correspondingly increase or decrease the range in adjusted bias values for spring 50, etc. It will be apparent that the range between the lowest and highest pressure settings will be fixed according to the lead of screw 52, the length of the moment arm of lever 39, the spring deflection constant of spring 50, etc.; and in the examples cited herein, this range will correspond to the ½ p.s.i. difference between the low pressure setting of ½ p.s.i. and high pressure setting of 1 p.s.i. However, it is to be noted that while the range is fixed, the valve device 4 may be readily calibrated to provide other low and high pressure settings of say ¼ p.s.i. and ¾ p.s.i., in the following manner.

To calibrate the control valve device 4, hand wheel 61 is screwed counterclockwise to its quick or manual deflate position, in which element 46 is in its previously described lower limit position and release valve 34 is operatively unseated; then said hand wheel is removed by removing plug 62 and element 66. Then the chamber 12 is connected to a source of pressure fluid; chamber 30 and passage 18 are connected to a calibrating volume or a single dunnage member 1; and a pressure gage is hooked up to read pressure in the chamber 30. Lock nut 60 is then spun downward on screw 52. Screw 52 is thereafter slowly screwed inwardly of nut 54, by applying a wrench force to wrench-engageable portion 57, for operatively causing successive reseating of release valve 34 and uncaging of spring 50, in the same manner as when said screw was rotated by clockwise rotation of the hand wheel 61 as above described. When the pressure of fluid in control chamber 30 stabilizes at the new desired low pressure setting, such as ¼ p.s.i., the lock nut 60 is screwed up into abutting contact with nut 54. Then the hand wheel 61 is slipped onto portion 58 of screw 52 and rotated to a position in which recess 64 (corresponding to the low pressure setting) is aligned with lock nut bore 68; whereupon locking element 66 is pushed upwardly through recess 64 and slot 63 and screwed into bore 68 so that the head portion 67 will seat in recess 64, and then hand wheel 61 is rotatively locked to screw 52 by plug 62.

The control valve device 4, as recalibrated, will now operate to normally maintain the dunnage members 1 inflated to either ¼ p.s.i. or ¾ p.s.i., according to whether the locking element 66 is seated in recess 64 or recess 65, in the same manner and under the conditions above described. It is contemplated that the low and high pressure settings (and any intermediate settings, if desired) will provide sufficient variation in predetermined adjusted bias values of spring 50 to permit shoring of any type of cargo units, and the calibration just described will therefore be accomplished at the factory and need not normally be done in the field.

It is to be noted that while the pressure control apparatus herein disclosed is shown associated with inflatable dunnage members used in freight carrying conveyances, such apparatus is also adapted to control, in the same manner, pressure of fluid in other types of inflatable members, such as the recently developed inflatable "igloos" used as warehouses and the like. These igloo-like structures may take the form of a shape-defining fabric framework containing a plurality of compartments or separate inflatable members, each (like the dunnage members 1) simultaneously chargeable or ventable via a common charging pipe or manifold (corresponding to pipe 3), with a control pipe (like 5) connected to one of these compartments or members to read true pressure therein and constantly connected to chamber 30 of the control valve device 4, the selector valve device 6 being unnecessary in an apparatus employed for such structures. It will be apparent that the control valve device 4, if employed with these inflatable structures, would operate to maintain the compartments or members charged to a desired pressure irrespective of changes in ambient temperature or pressure.

It will also be understood that this pressure control apparatus may be employed to control pressure in a single large volume member (as well as a plurality of such members) to which and from which fluid pressure is conveyed via a charging pipe separate from the control pipe reading true pressure in such member; such member need not necessarily be inflatable, and could, for example, be a fluid pressure reservoir.

In view of the foregoing, the invention is not to be limited except as defined in the appended claims.

Having now described the invention, what I claim as new and desire to secure by Letters Patent, is:

1. In combination, a member of large volume chargeable with gas under pressure, a charging pipe via which gas under pressure is conveyed to and from the member, a control pipe connected to the member at a point remote from the point of connection of the charging pipe thereto to read the true gas pressure within the member, a source of gas under pressure, and a self-lapping type control valve device comprising means providing a restricted communication between the source and a chamber, supply valve means controlling connection of the source with the charging pipe, bleed-off valve means controlling connection of the chamber with the charging pipe, release valve means controlling connection of the charging pipe with a release communication, means urging each of said valve means to a closed position, motor means for opening said supply valve means when source pressure exceeds chamber pressure by a chosen degree, and means including other motor means subject opposingly to control pipe pressure and a bias pressure operative to open said bleed-off valve means or release valve means selectively according to whether control pipe pressure is less than or exceeds the value of said bias pressure, thereby to maintain pressure in said member at a desired value corresponding substantially to the value of said bias pressure.

2. The combination according to claim 1, wherein said other motor means has a lap position in which it is ineffective to open either said bleed-off valve means or release valve means for thereby effecting closure thereof to bottle up gas under pressure in the member.

3. The combination according to claim 1, including mechanism manually operable for opening said release valve means independently of said other motor means to exhaust gas from the member, and means responsive to operation of said mechanism to release valve-means-opening position to relieve the bias pressure on said other motor means thereby to prevent the latter from operatively opening said bleed-off valve means and thereby prevent opening of said supply valve means.

4. The combination according to claim 1, wherein said bias pressure is imposed by a spring, and including manually operable mechanism for opening said release valve means independently of said other motor means, and means responsive to operation of said mechanism to release valve-means-opening position to nullify the action of said spring by withdrawing it from effective contact with said other motor means, thereby to effect complete venting of the member via the charging pipe and opened release valve means while preventing opening of the bleed-off valve means by said spring as control pipe pressure reduces below said desired value.

5. The combination according to claim 1, wherein said bias pressure is imposed by a spring means, and including manually adjustable means for preselecting the bias effect of said spring means and thereby selecting said desired value of pressure, said manually adjustable means comprising a reciprocable element serving as a seat for said spring, lever means rockable relative to a fixed means and operatively connected to and controlling the adjusted position of said element and thereby the degree of compression of said spring means, and an adjusting screw rotatable relative to the fixed means and operatively connected to said lever means at a point offset from its rocking axis for controlling the rockable position of said lever means.

6. In combination, a plurality of inflatable dunnage members of large volume arranged to resiliently shore cargo units in a freight-carrying conveyance, a conduit having branches via which gas under pressure is conveyed to and from the respective members, a control pipe connected to one of the members at a point remote from the point at which the respective conduit branch is connected thereto to read the true gas pressure within said one member, a source of gas under pressure, and a self-lapping control valve device comprising means providing a restricted communication between the source and a chamber, supply valve means controlling connection of the source with the conduit, bleed-off valve means controlling connection of the chamber with the conduit, release valve means controlling connection of the conduit with a release communication, means urging each of said valve means to a closed position, motor means for opening said supply valve means when source pressure exceeds chamber pressure by a chosen degree, and means including other motor means subject opposingly to control pipe pressure and a bias pressure operative to open said bleed-off valve means or release valve means selectively or to have no effect upon either bleed-off valve means or release valve means according to whether control pipe pressure is respectively less than or exceeds or is substantially equal to the value of said bias pressure, thereby to maintain pressure in all of said members substantially at a desired value corresponding to the value of said bias pressure.

7. In combination, a plurality of inflatable dunnage members of large volume arranged to resiliently shore cargo units in a freight-carrying conveyance, a conduit having branches via which gas under pressure is conveyed to and from the respective members, a source of gas under pressure, a self-lapping control valve device comprising means providing a restricted communication between the source and one chamber, supply valve means controlling connection of the source with the conduit, bleed-off valve means controlling connection of said one chamber with the conduit, release valve means controlling connection of the conduit with a release communication, means urging each of said valve means to a closed position, motor means for opening said supply valve means when pressure in said source exceeds pressure in said one chamber by a chosen degree, means including other motor means subject opposingly to pressure of gas in a control chamber and to a bias pressure and operative to open said bleed-off valve means or release valve means selectively or to have no effect upon either the bleed-off valve means or the release valve means according to whether control chamber pressure is respectively less than or exceeds or substantially equals the value of said bias pressure, and selector valve means subject opposingly to the respective pressures of gas in and operatively connected to two of said members at a point on each member remote from the point at which the respective conduit branch is connected thereto and operative to connect to the control chamber in bypass of said conduit whichever one of said two members contains fluid at the lesser pressure, whereby pressure in all of said members will be automatically controlled to correspond to that existing in the less highly charged of said two members.

8. The combination according to claim 7, wherein said two dunnage members are those at opposite ends of the conveyance.

References Cited in the file of this patent
UNITED STATES PATENTS

| | | |
|---|---|---|
| 2,856,867 | Dasey | Oct. 21, 1958 |
| 2,960,942 | Pier et al. | Nov. 22, 1960 |